(12) United States Patent
Lakshmi Narayanan et al.

(10) Patent No.: US 6,823,461 B2
(45) Date of Patent: Nov. 23, 2004

(54) METHOD AND SYSTEM FOR SECURELY TRANSFERRING CONTEXT UPDATES TOWARDS A MOBILE NODE IN A WIRELESS NETWORK

(75) Inventors: Ram Gopal Lakshmi Narayanan, Woburn, MA (US); Govindarajan Krishnamurthi, Arlington, MA (US); Senthil Sengodan, Burlington, MA (US)

(73) Assignee: Nokia Corporation, Espoo (FI)

( * ) Notice: Subject to any disclaimer, the term of this patent is extended or adjusted under 35 U.S.C. 154(b) by 118 days.

(21) Appl. No.: 10/186,249

(22) Filed: Jun. 27, 2002

(65) Prior Publication Data

US 2004/0003280 A1 Jan. 1, 2004

(51) Int. Cl.[7] .............................. H04L 9/00; H04K 1/00; G06F 15/16
(52) U.S. Cl. ...................... 713/200; 713/153; 713/201; 380/270; 709/227; 709/245
(58) Field of Search ................................. 713/153, 200, 713/201; 380/270; 709/227, 245, 203, 208, 218, 223, 226, 238, 242

(56) References Cited

U.S. PATENT DOCUMENTS

| | | | | |
|---|---|---|---|---|
| 6,038,233 A | * | 3/2000 | Hamamoto et al. | 370/401 |
| 6,049,878 A | * | 4/2000 | Caronni et al. | 713/201 |
| 6,118,784 A | * | 9/2000 | Tsuchiya et al. | 370/401 |
| 6,452,915 B1 | * | 9/2002 | Jorgensen | 370/338 |
| 6,496,479 B1 | * | 12/2002 | Shionozaki | 370/230 |
| 6,567,405 B1 | * | 5/2003 | Borella et al. | 370/389 |
| 6,570,851 B1 | * | 5/2003 | Koskelainen et al. | 370/231 |
| 6,580,717 B1 | * | 6/2003 | Higuchi et al. | 370/401 |
| 6,587,882 B1 | * | 7/2003 | Inoue et al. | 709/227 |
| 6,606,708 B1 | * | 8/2003 | Shifrin et al. | 713/201 |
| 6,629,149 B1 | * | 9/2003 | Fraser et al. | 709/245 |

OTHER PUBLICATIONS

Koodli et al., "A Framework for Smooth Handovers With Mobile IPv6", *Internet Draft, Internet Engineering Task Force*, Jul. 13, 2000.
Gopal et al., "IPSec Context Transfer", *Internet Draft, Internet Engineering Task Force*, Nov. 12, 2001.
Hamer et al., "Issues In IPSec Context Transfer", *Internet Draft, Internet Engineering Task Force*, Feb. 2002.
Kempf "Problem Description: Reasons for Performing Context Transfers Between Nodes In An IP Access Network", *Internet Draft, Internet Engineering Task Force*, Sep. 2002.
Tsirtis et al., "Fast Handovers for Mobile IPv6", *Internet Draft, Internet Engineering Task Force*, Sep. 30, 2002.
Syed et al., "General Requirements For A Context Transfer", *Internet Draft, Internet Engineering Task Force*, Oct. 2002.

* cited by examiner

Primary Examiner—Justin T. Darron
Assistant Examiner—Kambiz Zand
(74) Attorney, Agent, or Firm—Darby & Darby P.C.; Matthew M. Gaffney

(57) ABSTRACT

A method and system for transferring contexts from a previous access router (PR) to a new access router (NR) that is subsequently associated with a Mobile Node (MN). For example, transferred contexts may include, but are not limited to, Security, Quality of Service (QOS), Header Compression, and Buffers. A context is transferred from the PR to the NR. Any change in an element of the context is conveyed by the NR to the MN in a secure fashion, even though a Security Association does not yet exist between the NR and MN. The NR provides an authenticated security context update to the MN, e.g., advising when the type of encryption has changed from Triple Data Encryption Standard (DES) to DES. The NR utilizes the Security Association between the PR and the MN, to provide such an authenticated security context update to the MN over a RAN or a wireless LAN.

27 Claims, 3 Drawing Sheets

METHOD AND SYSTEM FOR SECURELY TRANSFERRING CONTEXT UPDATES TOWARDS A MOBILE NODE IN A WIRELESS NETWORK

FIELD OF THE INVENTION

The invention relates generally to an association between a mobile node and an access router, and more particularly to enabling the secure transfer of context information from a previous access router to a new access router that is currently associated with a mobile node.

BACKGROUND OF THE INVENTION

The Internet is arranged so that a computing device such as a mobile node can have a unique address by which it can be identified. When data is transmitted over the Internet from the mobile node to a correspondent node, it is generally broken down into smaller groupings called "packets". In addition to the data which is being transmitted, the packets will normally include important transmission information such as the sender's identity as source IP Address, the addressee or intended recipient's IP Address as destination address, the actual data (or data request), and so on.

Each packet transmitted from a mobile node to a correspondent node may travel through several network devices such as base stations, hubs, switches, bridge-routers (brouter), and routers/gateways. If a mobile node is part of a wireless network, the access point/base station will generally operate as a bridge to which the mobile node is connected. The bridge is a layer 2 device and relays all traffic to/from wireless to wireline network. The access point may either be directly attached to the access router or through series other network nodes. The access router on receiving the packets, determines the best way to forward them towards their final destination, i.e., the correspondent node.

Once the access router has determined how a particular packet is to be sent based on its routing tables, it selects another router suited to send the packet towards its final destination and transmits/forwards the message to this other router.

When the packet is near to its destination, it is typically passed to a local hub, which retransmits the message to its intended recipient computing device, such as the correspondent node. The recipient correspondent node then reassembles the packet along with the other parts (packets) of the original message to create the complete set of data originally transmitted by the mobile node. However, when a particular network device reaches maximum capacity due to some overload condition, packets are typically dropped by the network device, i.e., the packets are discarded and not forwarded to their destination. Depending upon the protocol used to forward a packet toward its destination, a dropped packet may be retransmitted until the complete message is received by the destination.

In a mobile IP network, when a mobile node changes its point of attachment to the network, a handover may occur between the previous access router (PR) and a new access router (NR). The association of a mobile node with a PR may be handed over to an NR for a variety of reasons. For example, the mobile node may have physically moved to another location where the PR is no longer able to provide IP connectivity to the mobile node. Therefore, the mobile node re-associates with an NR for IP connectivity. Similarly, changes in network traffic demands may cause the PR associated with a mobile node to become overloaded. In this case, the association of the mobile node can be changed to an NR that is less loaded.

In any case, the result of a IP level handover between points of attachment causes a mobile node to reconnect to the IP network through a NR instead of a PR. Such a handover may occur between access routers disposed within the same administrative (or routing) domain or across administrative domains.

The ARs may also store mobile specific data or context. An example of such a context is that pertaining to security associations that the mobile node maintains with PR. To enable seamless mobility, a method that enabled the transfer of this security context from PR to NR would alleviate the need for performing elaborate authentication processes during a handover to re-establish a secure relationship between the mobile node and the NR.

It is with respect to these considerations and others that the present invention has been made, and will be understood by reading and studying the following specification.

SUMMARY OF THE INVENTION

In accordance with the invention, a method is provided for enabling the transfer of each context associated with a mobile node (MN) from a previous access router (PR) and a new access router (NR). A security association exists between the PR and the MN that enables the MN to communicate over an IP network. When the MN is subsequently associated with the NR instead of the PR, the PR securely transfers each context associated with the MN to the NR. Due to some reasons if NR is not able to use some of the context and requires to modify some of the fields, then the NR securely provides an update to the MN indicating the changes made to the transferred context. The existing security association between the PR and the MN is used to communicate the changes in the context to the MN. The recreated security association is based on the context transferred by the PR to the NR and any update to the context. This recreated security association is subsequently indicated by the NR to the MN.

In accordance with another aspect of the invention, a secure channel of communication is provided between the NR and the PR. Also, the transferred context includes at least one of security, header compression, Quality of Service, and buffers. Additionally, the IPsec and or Transport Layer Security (TLS) protocol may be employed to provide secure communication between the MN and the NR.

In accordance with yet another aspect of the invention, if the MN moves to another point of attachment to the IP network, the MN can be subsequently associated with the NR instead of the PR. Also, if a load on the PR is relatively large and another load on the NR is relatively small, the MN may be caused to be subsequently associated with the NR.

In accordance with still another aspect of the invention, if the MN is to be associated with the NR, the PR securely transfers each context associated with the MN to the NR prior to the subsequent association of the MN with the NR. In accordance with further aspect of the invention, the NR generates a update message which is authenticated by PR. MN validates and updates the received authenticated packet. Additionally, the PR can cause the authenticated update to be tunneled through the NR to the MN using IP encapsulation. Furthermore, the MN can verify the authenticated update.

In accordance with yet another aspect of the invention, an apparatus, system and computer readable medium may be employed to practice substantially the same actions discussed above for the method.

DETAILED DESCRIPTION OF THE PREFERRED EMBODIMENT

Figure 1:
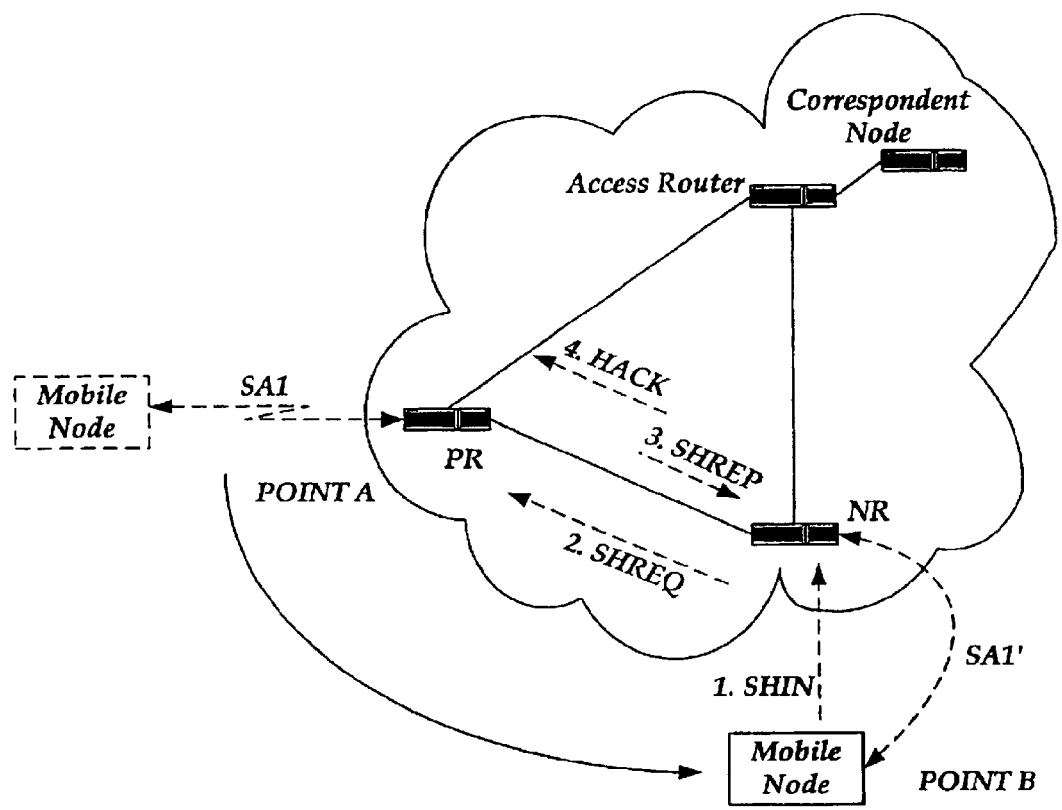
FIG. 1 shows an exemplary context transfer between a previous access router and a new access router when no update is necessary.

In the following detailed description of exemplary embodiments of the invention, reference is made to the accompanied drawings, which form a part hereof, and which is shown by way of illustration, specific exemplary embodiments of which the invention may be practiced. Each embodiment is described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The term "flow" refers to a flow of packets. The term "user" refers to any person or customer such as a business or organization that employs a mobile node to communicate or access resources over a mobile IP network. The term "identifier" refers to a Mobile Subscriber International Subscriber Digital Network (MSISDN) number, an IP address, or any other information that relates to the location or identity of the user. The term "modulated data signal" refers to a signal that has one or more of its characteristics set or changed in such a manner as to encode information in the signal.

The term "router" refers to a dedicated network element that receives packets and forwards them towards the destination. In particular, a router is used to extend or segment networks by forwarding packets from one subnet to another. A router typically operates at layer 3 TCP/IP of the Open Systems Interconnection (OSI) reference model for networking. However, some routers can provide additional functionality that operates above layer 3 of TCP/IP or OSI reference model.

The term "access router" refers to a router that is associated with a mobile node for providing IP connectivity between the mobile node and other nodes on an IP network, such as a correspondent node. Although the access router is a dedicated network element coupled to the IP network, it may also be in communication with one or more points of attachment for a wireless network.

The term "Mobile Node" refers to a wireless device that changes its point of attachment from one network or subnetwork to another. A mobile node may change its location without losing connectivity and without changing its IP address; it may continue to communicate with other Internet nodes at any location using its (constant) IP address, assuming link-layer connectivity to a point of attachment is available. A mobile node is given a long-term home IP address on a home network. This home address is administered in substantially the same way as a "permanent" IP address is provided to a stationary host. A mobile node can change its point of attachment from one link to another, while still being reachable via its home address.

The term "Correspondent Node" refers to a peer with which a mobile node is communicating. A correspondent node may be either mobile or stationary Referring to the drawings, like numbers indicate like parts throughout the views. Additionally, a reference to the singular includes a reference to the plural unless otherwise stated or is inconsistent with the disclosure herein.

This invention can use any method and system for transferring contexts from a previous access router (PR) to a new access router (NR) that is subsequently associated with a mobile node (MN). The invention is not bound by any such mechanisms for transferring context from a PR to an NR. For example, transferred contexts may include, but are not limited to, Security, Quality of Service (QOS), Header Compression, and Buffers. A context is transferred from the PR to the NR. Also, any change in an element of the context is conveyed by the NR to the MN in a secure fashion, even though a Security Association does not yet exist between the NR and MN. This happens particularly when there are changes to the security context. The NR provides an authenticated security context update to the MN, e.g., advising when the type of encryption has changed from Triple Data Encryption Standard (DES) to DES.

The invention may be generalized to the case where entity N needs to convey information to entity M in a secure fashion, although no Security Association exists between M and N. M shares a Security Association with another entity P, and there is a Security Association between P and N. Using this security relationship (association), context may be moved to the NR at the new point of attachment, prior to, during or immediately after the handover.

The automatic transfer of contexts enables seamless (uninterrupted) session continuity during a handover between a PR and an NR. Also, context transfers enable reduced latency and improved handover quality. As discussed above, one such context is that pertaining to Security Associations. In the past, re-establishing a Security Association contributed to a relatively high latency in a handover from a PR to an NR.

In the present invention, the context associated with providing a secure connection to an MN is automatically transferred from the PR to the NR so that a Security Association between the MN and the NR can be quickly recreated based on the previous Security Association between the MN and the PR. A change to any element of the transferred security context is automatically provided to the MN by the NR. Although there are no Security Associations initially established between the NR and the MN, the previously existing Security Associations between the MN and the PR and between the PR and the NR are used to securely notify the MN of any change in an element of the transferred security contexts. In this way, the invention can reduce the likelihood that an attack on the packets in transit between the MN and the PR will be successful during the initial period of time when a Security Association between the MN and the PR is not yet operative.

In mobile IP networks, the authentication of an MN by the access router is important to prevent abuse by unauthorized users. Typically, before a mobile IP network offers connectivity and features such as security, Quality of Service (QoS), buffers and header compression, suitable measures are undertaken to ensure that the MN is first authenticated.

Upon successful authentication, the MN establishes a Security Association with an access router for securely communicating over the mobile IP network. Secure channels are employed for mobile-initiated context transfers and fast handovers between a PR and an NR. In context transfers, an MN authorizes a PR to transfer each context to an NR. Similarly, in fast handovers, an MN authorizes a PR to transfer each context to an NR while the MN is still associated with the PR. Additionally, the MN can communicate with the PR over a Radio Access Network (RAN) or a wireless Local Area Network (LAN) employing a wireless protocol such as IEEE 802.11, Bluetooth, and the like.

Illustrative Context Transfers

Using the security context transfer process between a PR and an NR, details of the Security Association between the MN and the PR is used to recreate an SA at the NR with the MN. By doing so, the delay in establishing a completely new Security Association at the NR with the MN is avoided. FIG. 1 illustrates a reactive process for a security context transfer using a message exchange when no update is necessary for the MN. An established control Security Association (SA1) is shown (dotted lines) between the MN and the PR at Point of Attachment A.

Also, at Point of Attachment B, the previous control Security Association (SA1') has been recreated between the MN and NR based on a security context that is transferred from the PR to the NR. The security context is transferred from the PR to the NR via a sequence of messages so that the previously existing SA1 can be recreated as SA1' between the MN and NR.

An exemplary sequence of such messages follows. First, the MN sends a SHIN message to the NR that includes the MN's identity and a token that it received from the PR. Second, the NR sends a SHREQ message to the PR to request a list of contexts related to the MN. Third, the PR replies to the NR with a SHREP message that lists all of the contexts for the MN. Fourth, the NR provides a HACK message to the PR to indicate if the previous Security Association (SA1) can be recreated as SA1' between the MN and the PR. Another instantiation of the above process is the MN directly requesting the PR to push its context to NR after handover.

If the NR is able to use the previous Security Association (SA1'), the control SA is transferred from the PR as is to the NR and no update message is sent to the MN. However, if the security context received at NR needs to be updated, the invention provides for conveying these updates from the NR to the MN in a secure fashion. Although initially there is not an SA between the MN and the NR, it is important that these changes be provided in a secure manner.

Figure 2:
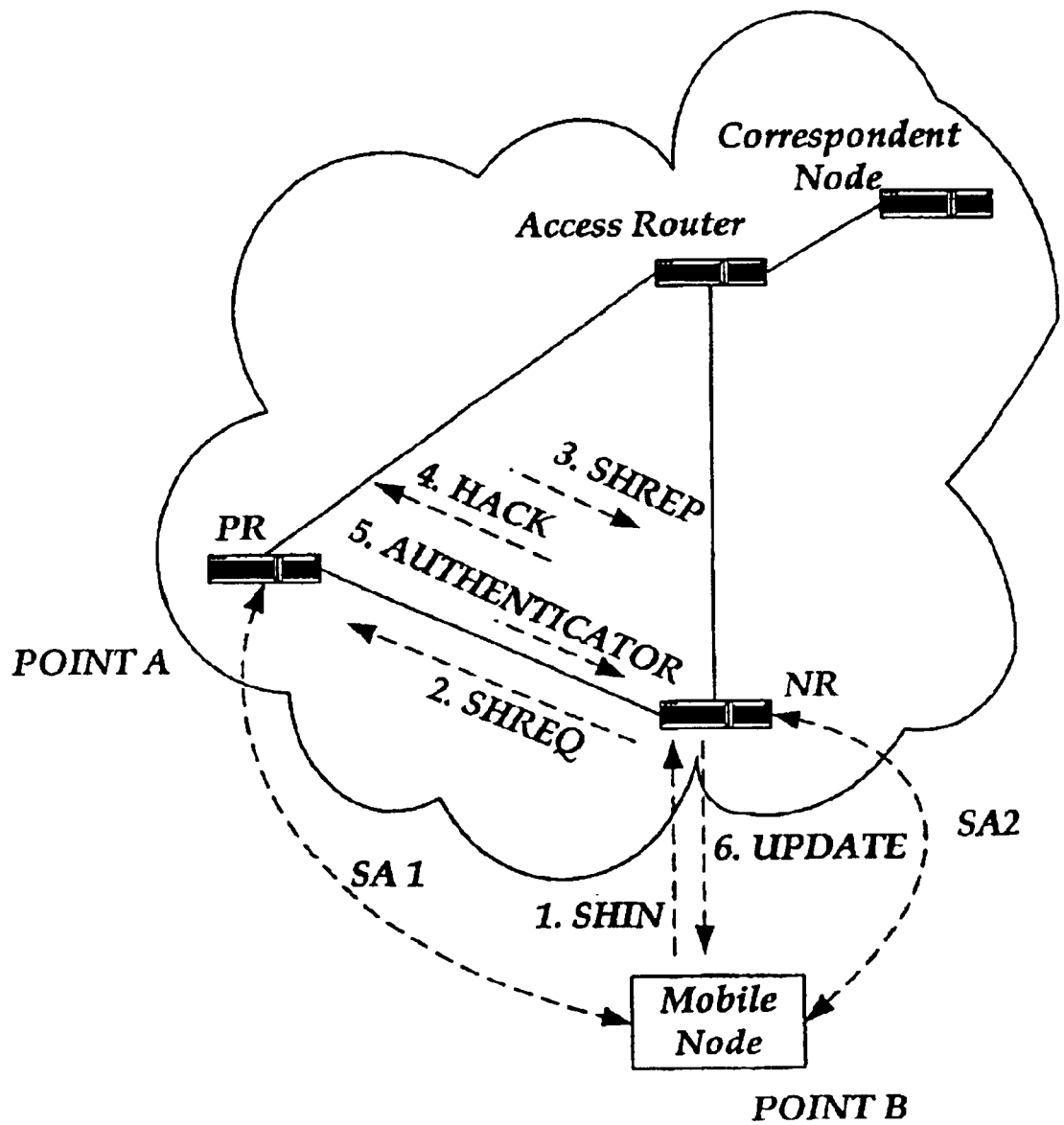
FIG. 2 illustrates another exemplary context transfer between a previous access router and a new access router when an update is necessary.

FIG. 2 illustrates a reactive process for a security context transfer using a message exchange when an update is necessary and provided to the MN by the NR. If the Security Association between the PR and the MN (SA1) cannot be relocated to the NR without changes, the following are the message sequences. First, the MN sends a SHIN message to the NR. The message includes the MN's identity and a token that it received from the PR. Second, the NR sends a SHREQ message to the PR requesting the security context related to the MN. Third, the PR replies with a SHREP message that includes a list of Security Associations, such as control, data and management. Fourth, the NR replies to the PR with a HACK message and advises if the NR is able to recreate the SA1 (control Security Association between the MN and PR). If so, the MN and the PR are informed. However, if the NR is not able to recreate SA1, the NR forwards an update to the context to the PR and asks the PR to prepare an authenticated update for use with the MN.

Next, the PR prepares the authenticated update using parameters associated with SA1 and tunnels the authenticated update back to the MN via the NR. Finally, the MN employs the authenticated update message from the PR and to create a Security Association (SA2) between the MN and the NR.

IPsec is one communication protocol that may be used to secure communications between an access router (PR or NR) and an MN. IPsec is often employed in a Security Association between an MN and its current access router for enabling fast handovers and context transfers. The invention reduces the number of authentication steps necessary to establish a trusted relationship between the MN and the NR, e.g., when an IPsec based Security Association can be transferred from a PR to an NR during a handover.

There are several ways to send an authenticated context update from the PR to the NR. In one exemplary embodiment, the PR can send the authenticated update to the NR using IP-in-IP encapsulation. In such a case, the PR prepares an encapsulated packet and adds an authenticator to both the inner and outer IP packets. The inner IP packet is an update packet based on the Security Association that the PR previously shared with the MN. The PR then sends this authenticated packet to the NR where the inner IP packet is forwarded to the MN. In another exemplary embodiment, the authenticator alone can be sent from the PR to the NR. Typically, the authenticator is sent in an IP datagram that is secured by the previously existing Security Association between the PR and the NR. The NR can add the authenticator to the context update and send both to the MN.

Additionally, the specific framework and the corresponding messages (SHIN, SHREQ, SHREP et al.) used in FIGS. 1 and 2 are for illustration only, and the invention is applicable with any other context transfer framework as well.

Illustrative Flow Chart

Figure 3:
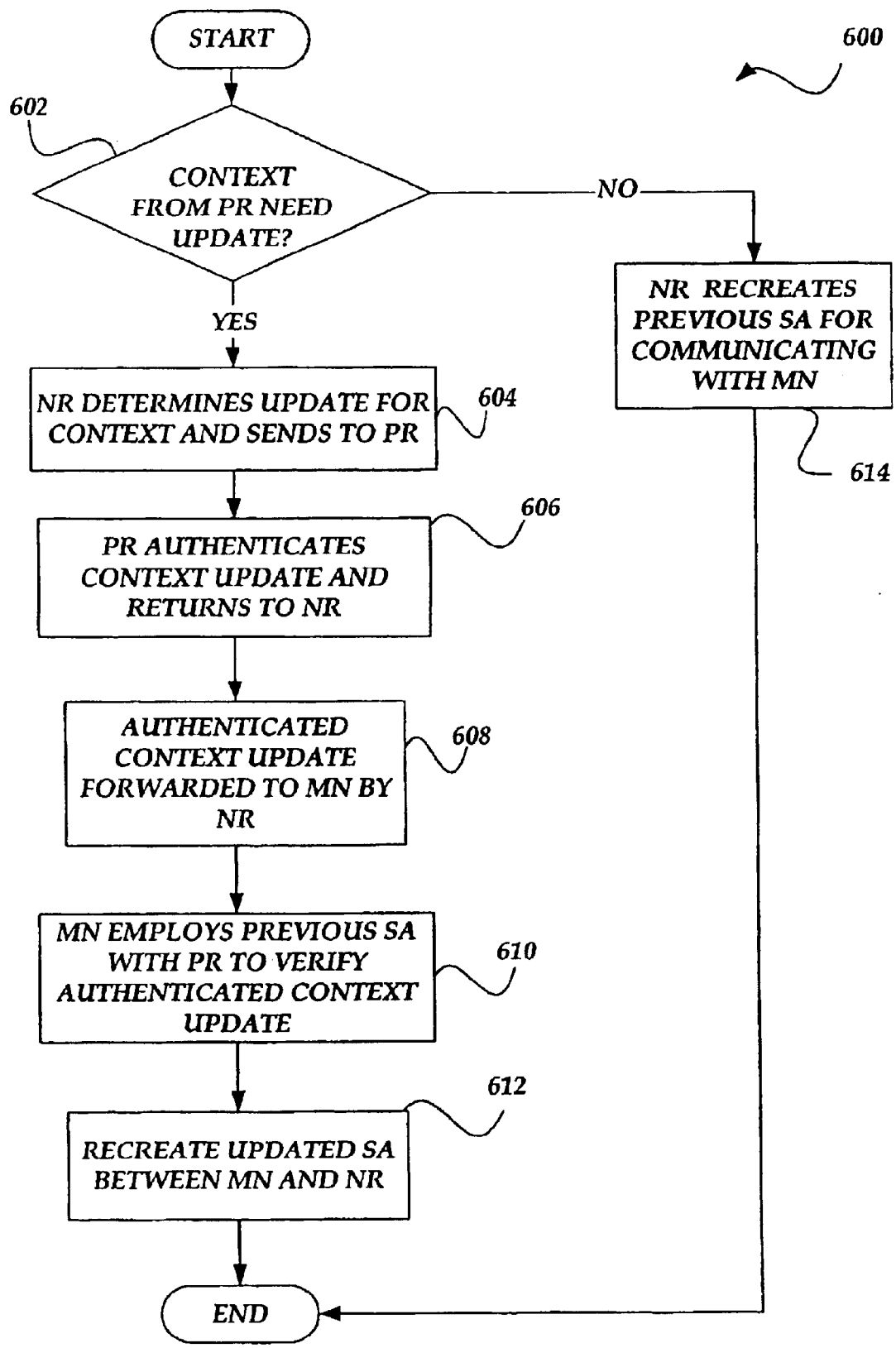
FIG. 3 shows a flow chart illustrating an overview of the actions performed for transferring contexts from a previous access router to a new access router in accordance with the invention.

FIG. 3 illustrates a process (600) for transferring a context from a previous access router (PR) to a new access router (NR) when an association of a mobile node (MN) with the PR is changed to the NR. Moving from a start block, the process flow to a decision block 602 where a determination is made as to whether a context transferred from the PR to the NR needs to be updated. Each transferred context may need to be updated for a different reason. For example, the level of encryption for the security context may be less at the NR, one of the parameters in the Quality of Service context may be unsupported by the NR, and the header compression context may be less at the NR.

When the determination at decision block 602 is negative, the process advances to block 614 where the NR recreates a Security Association with the MN that is substantially similar to the previous Security Association between the PR and the MN. Next, the process moves to an end block and returns to processing other actions.

Alternatively, when the determination at decision block 602 is affirmative, the process moves to block 604 where the NR determines and update for the context and sends the update to the PR. The process advances to block 606 where the PR authenticates the update with the previous Security Association between the PR and the MN. The PR returns the authenticated update to the NR. The process flows to block 608 where the authenticated update is forwarded to the MN by the NR. Additionally, the PR may tunnel the authenticated update through the NR to the MN.

At block 610, the process enables the MN to employ its previous Security Association with the PR to verify the authenticated update for the context provided by the NR.

Moving to block 612, the NR recreates an updated Security Association with the MN for data associated with the context. Next, the process advances to an end block and returns to processing other actions.

Although an exemplary process for transferring a security context is discussed above, the invention is applicable with any context and not just the exemplary security context transfer framework process discussed above.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for enabling a new access router (NR) to communicate securely with a Node (N) over a network, comprising:
    (a) enabling a Security Association (SA) between a previous access router (PR) and N;
    (b) employing the SA between PR and N to enable NR to communicate securely with N when N is associated with NR; and
    (c) if N is subsequently associated with NR instead of PR, causing PR to securely transfer at least one context associated with N from PR to NR;
    (d) if NR differently enables at least one element of a transferred context for N, causing NR to securely provide an update to N indicating each different element of the transferred context; and
    (e) enabling another security association to be created between NR and N for the transferred context such that the other security association is based on the context transferred by PR to NR, and such that, if an update to the context is provided by NR to N, the other security associated is also based on the update.

2. The method of claim 1, wherein the transferred context includes at least one of security, header compression, Quality of Service, and buffers.

3. The method of claim 1, subparagraph (c) further comprising if N moves to another point of attachment in the network, causing N to be subsequently associated with the NR.

4. The method of claim 1, subparagraph (c) further comprising if a load on PR is relatively large and another load on NR is relatively small, causing N to be subsequently associated with NR.

5. The method of claim 1, subparagraph (c), further comprising if N is to be associated with NR, causing PR to securely transfer at least one context associated with N to NR prior to the subsequent association of N with NR.

6. The method of claim 1, subparagraph (c), further comprising during a transition where the association of N with NR is being set up, causing PR to securely transfer each context associated with the N to NR.

7. The method of claim 1, subparagraph (d), further comprising:
    (a) employing NR to provide the update to PR for authentication;
    (b) employing NR to receive an authenticator for the update from PR; and
    (c) employing NR to forward an authenticated update to N.

8. The method of claim 1, further comprising providing an authenticator by PR to NR in an IP datagram that is separate from the update.

9. The method of claim 1, further comprising enabling PR to cause an authenticated update to be tunneled through NR to N using IP encapsulation.

10. The method of claim 1, further comprising enabling N to verify an authenticated update based on the association that it shares with PR.

11. The method of claim 1, wherein node N is a mobile node (MN).

12. The method of claim 1, wherein node N is a correspondent node (CN) that is in communication with a Mobile Node (MN) associated with PR and NR.

13. The method of claim 1, further comprising providing a wireless interface between N and NR.

14. The method of claim 1, further comprising providing a secure channel of communication between NR and PR.

15. The method of claim 1, further comprising employing a security protocol to provide secure communication between N and NR, wherein the security protocol includes at least one of IPsec, TLS and HTTPS.

16. The method of claim 1, wherein NR and PR are logically disposed in separate domains.

17. The method of claim 16, wherein node N is a mobile node (MN).

18. The method of claim 16, wherein node N is a correspondent node (CN) that is in communication with a Mobile Node (MN) associated with PR and NR.

19. The method of claim 16, further comprising providing a secure channel of communication between NR and PR.

20. The method of claim 16, further comprising employing a security protocol to provide secure communication between N and NR, wherein the security protocol includes at least one of IPsec, TLS and HTTPS.

21. A system for enabling a new access router (NR) to communicate securely with a node (N) over a network, comprising:
    (a) a destination for packets sent over the network; and
    (b) the node N that performs actions, including:
        (i) enabling a Security Association (SA) between a previous access router (PR) and N;
        (ii) employing the SA between PR and N to enable NR to communicate securely with N when N is associated with NR;
        (iii) if N is subsequently associated with NR instead of PR, causing PR to securely transfer at least one context associated with N from PR to NR;
        (iv) if NR differently enables at least one element of a transferred context for N, causing NR to securely provide an update to N indicating each different element of the transferred context; and
        (v) enabling another security association to be created between NR and N for the transferred context such that the other security association is based on the context transferred by PR to NR, and such that, if an update to the context is provided by NR to N, the other security associated is also based on the update.

22. The system of claim 21, wherein at least one of NR and PR operate as an IP Radio Access Network (RAN) Base Station Router.

23. The system of claim 21, wherein at least one of NR and PR operate as a Wireless LAN Access Router.

24. An apparatus for enabling a new access router (NR) to communicate securely with a node (N) over a network, comprising:
    (a) a network interface that employs a packet-based protocol to send and receive packets over a wireless interface; and
    (b) a transcoder that performs actions, including:

(i) enabling a Security Association (SA) between a previous access router (PR) and N;
(ii) employing the SA between PR and N to enable NR to communicate securely with N when N is associated with NR
(iii) if N is subsequently associated with NR instead of PR, causing PR to securely transfer at least one context associated with N from PR to NR;
(iv) if NR differently enables at least one element of a transferred context for N, causing NR to securely provide an update to N indicating each different element of the transferred context; and
(v) enabling another security association to be created between NR and N for the transferred context such that the other security association is based on the context transferred by PR to NR, and such that, if an update to the context is provided by NR to N, the other security associated is also based on the update.

25. The apparatus of claim 24, subparagraph (b), further comprising:
   (a) enabling NR to provide an update to PR for authentication;
   (b) enabling NR to receive an authentication for the update from PR; and
   (c) enabling NR to forward an authenticated update to N.

26. The apparatus of claim 24, further comprising enabling PR to tunnel an authenticated update through NR to N using IP encapsulation.

27. A computer-readable medium that includes instructions for performing actions, including:
   (a) enabling a Security Association (SA) between a previous access router (PR) and N;
   (b) employing the SA between PR and N to enable NR to communicate securely with N when N is associated with NR;
   (c) if N is subsequently associated with NR instead of PR, causing PR to securely transfer at least one context associated with N from PR to NR;
   (d) if NR differently enables at least one element of a transferred context for N, causing NR to securely provide an update to N indicating each different element of the transferred context; and
   (e) enabling a security association between PR and N to be recreated between NR and N for the transferred context such that the other security association is based on the context transferred by PR to NR, and such that, if an update to the context is provided by NR to N, the other security associated is also based on the update.

* * * * *

UNITED STATES PATENT AND TRADEMARK OFFICE
CERTIFICATE OF CORRECTION

PATENT NO. : 6,823,461 B2
DATED : November 23, 2004
INVENTOR(S) : Ram Gopal Lakshmi Narayanan et al.

It is certified that error appears in the above-identified patent and that said Letters Patent is hereby corrected as shown below:

Title page,
Item [56], References Cited, U.S. PATENT DOCUMENTS, delete
"Shifrin" and insert -- Devine --.
OTHER PUBLICATIONS,
"Tsirtis" should read -- Tsirtsis --.
*Primary Examiner*, delete "Darron" and insert -- Darrow --.

Column 2,
Lines 3 and 58, delete "a" and insert -- an --.

Column 4,
Line 7, after "stationary" insert -- . --.

Signed and Sealed this

Fourteenth Day of March, 2006

JON W. DUDAS
*Director of the United States Patent and Trademark Office*